(12) United States Patent
Tomana et al.

(10) Patent No.: US 10,763,521 B2
(45) Date of Patent: Sep. 1, 2020

(54) FUEL CELL SEPARATOR AND FUEL CELL STACK

(71) Applicant: HONDA MOTOR CO., LTD., Minato-ku, Tokyo (JP)

(72) Inventors: Yu Tomana, Wako (JP); Satoshi Oyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/120,536

(22) Filed: Sep. 4, 2018

(65) Prior Publication Data

US 2019/0074525 A1 Mar. 7, 2019

(30) Foreign Application Priority Data

Sep. 7, 2017 (JP) ................................ 2017-172273

(51) Int. Cl.
| | | |
|---|---|---|
| *H01M 8/026* | (2016.01) | |
| *H01M 8/0276* | (2016.01) | |
| *H01M 8/0297* | (2016.01) | |
| *H01M 8/0258* | (2016.01) | |
| *H01M 8/0254* | (2016.01) | |
| *H01M 8/0267* | (2016.01) | |
| *H01M 8/0206* | (2016.01) | |
| *H01M 8/1018* | (2016.01) | |

(52) U.S. Cl.
CPC ......... *H01M 8/026* (2013.01); *H01M 8/0206* (2013.01); *H01M 8/0254* (2013.01); *H01M 8/0258* (2013.01); *H01M 8/0267* (2013.01); *H01M 8/0276* (2013.01); *H01M 8/0297* (2013.01); *H01M 2008/1095* (2013.01)

(58) Field of Classification Search
CPC ........................... H01M 8/026; H01M 8/0276
See application file for complete search history.

(56) References Cited

U.S. PATENT DOCUMENTS

| | | |
|---|---|---|
| 7,718,293 B2 | 5/2010 | Strobel et al. |
| 8,722,219 B2 | 5/2014 | Kikuchi et al. |
| | (Continued) | |

FOREIGN PATENT DOCUMENTS

| | | |
|---|---|---|
| DE | 10248531 | 4/2004 |
| DE | 102005026060 | 11/2006 |
| | (Continued) | |

OTHER PUBLICATIONS

German Office Action for German Patent Application No. 102018215060.5 dated Nov. 29, 2019.

*Primary Examiner* — Sarah A. Slifka
*Assistant Examiner* — Brent C Thomas
(74) *Attorney, Agent, or Firm* — Amin, Turocy & Watson, LLP

(57) ABSTRACT

A coolant flow field is formed between first and second metal separator plates of a joint separator (fuel cell separator). First and second beads protrude from the first and second metal separator plates. The beads include inner beads for preventing leakage of a reactant gas. An air release passage and a coolant drain passage extend through the fuel cell separator in a separator thickness direction, and the air release passage and the coolant drain passage are connected to a coolant flow field through a first connection channel and a second connection channel formed by recesses on the back of protrusions of the first and second beads.

11 Claims, 9 Drawing Sheets

(56) References Cited

U.S. PATENT DOCUMENTS

| | | | |
|---|---|---|---|
| 2004/0106028 A1 | 6/2004 | Sugiura et al. | |
| 2007/0154758 A1* | 7/2007 | Kikuchi | H01M 8/0258 429/434 |
| 2007/0231619 A1* | 10/2007 | Strobel | C25B 9/203 429/457 |
| 2017/0324099 A1* | 11/2017 | Stoehr | C25B 9/203 |

FOREIGN PATENT DOCUMENTS

| | | |
|---|---|---|
| JP | 2004-193110 | 7/2004 |
| JP | 2007-134206 | 5/2007 |
| JP | 2007-141543 | 6/2007 |
| JP | 2017-139218 | 8/2017 |

\* cited by examiner

FUEL CELL SEPARATOR AND FUEL CELL STACK

CROSS-REFERENCE TO RELATED APPLICATION

This application is based upon and claims the benefit of priority from Japanese Patent Application No. 2017-172273 filed on Sep. 7, 2017, the contents of which are incorporated herein by reference.

BACKGROUND OF THE INVENTION

Field of the Invention

The present invention relates to a fuel cell separator and a fuel cell stack.

Description of the Related Art

In general, a solid polymer electrolyte fuel cell adopts a solid polymer electrolyte membrane. The solid polymer electrolyte membrane is a polymer ion exchange membrane. The fuel cell includes a membrane electrode assembly (MEA) formed by providing an anode on one surface of the solid polymer electrolyte membrane, and a cathode on the other surface of the solid polymer electrolyte membrane. The membrane electrode assembly is sandwiched between separators (bipolar plates) to form a power generation cell (unit cell). In use, a predetermined number of power generation cells are stacked together to form, e.g., an in-vehicle fuel cell stack mounted in a vehicle.

In the power generation cell, as the separators, metal separators may be used, as in the case of Japanese Laid-Open Patent Publication No. 2004-193110. In Japanese Laid-Open Patent Publication No. 2004-193110, two metal separator plates are joined together to form one joint separator. In this case, a coolant flow field as a passage of coolant is formed along separator surfaces between the two metal separator plates. Further, in order to reliably discharge the air from the coolant flow field at the time of supplying the coolant to the coolant flow field, an air release passage connected to the coolant flow field extends through an upper portion of the joint separator.

According to the disclosure of Japanese Laid-Open Patent Publication No. 2007-134206, a coolant flow field is formed between two metal separator plates. An air release passage is formed at an upper portion of each of the metal separator plates. In order to release the coolant from the coolant flow field at the time of performing a maintenance operation, etc., a coolant drain passage is formed at a lower position of each of the metal separator plates. In this case, the air release passage and the coolant drain passage are connected to the coolant flow field.

According to the disclosure of U.S. Pat. No. 7,718,293, in order to reduce the production cost, a ridge shaped bead seal is formed as a seal in a metal separator by press forming.

SUMMARY OF THE INVENTION

The present invention has been made in relation to the above described conventional technique, and an object of the present invention is to provide a fuel cell separator and a fuel cell stack in which it is possible to realize simple coolant flow field structure.

In order to achieve the above object, the present invention provides a fuel cell separator including two metal separator plates joined together, a bead protruding from one surface of each of the metal separator plates where a reactant gas flows, a reactant gas flow field being formed on the one surface of the metal separator plate and configured to allow a reactant gas of a fuel gas or an oxygen-containing gas to flow along the reactant gas flow field, a coolant flow field being formed between the two metal separator plates, a reactant gas passage connected to the reactant gas flow field extending through the fuel cell separator in a separator thickness direction, the bead including a seal bead configured to prevent leakage of the reactant gas, wherein at least one of an air release passage and a coolant drain passage extends through the fuel cell separator in the separator thickness direction, and at least one of the air release passage and the coolant drain passage is connected to the coolant flow field through a connection channel formed by a recess on back of a protrusion of the bead.

The bead may include an upper connection bead. The connection channel configured to connect the air release passage and an internal space of the seal bead may be formed inside the upper connection bead, and the upper connection bead is connected to an uppermost position of the seal bead provided around the reactant gas flow field.

The bead may include a lower connection bead, the connection channel configured to connect the coolant drain passage and an internal space of the seal bead may be formed inside the lower connection bead, and the lower connection bead may be connected to a lowermost position of the seal bead provided around the reactant gas flow field.

The fuel cell separator may include a passage bead seal provided around the air release passage or the coolant drain passage.

The passage bead seal may have a circular shape in a plan view.

The passage bead seal may include an inner side wall inclined from the separator thickness direction and the inner side wall may have a through hole configured to connect an internal space of the passage bead seal and the air release passage or the coolant drain passage.

An outer end of the coolant flow field and an outer end of the reactant gas passage may be joined together by welding or brazing.

Further, a fuel cell stack of the present invention includes a plurality of the above fuel cell separators and a plurality of membrane electrode assemblies stacked alternately.

In the fuel cell separator and the fuel cell stack according to the present invention, at least one of the air release passage and the coolant drain passage is connected to the coolant flow field through the connection channel formed by the recess on the back of the protrusion of the bead. In the structure, it is possible to effectively utilize the recess on the back of the bead provided for the metal separator plate, and realize simple coolant flow field structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, preferred embodiments of a fuel cell separator and a fuel cell stack according to the present invention will be described with reference to the accompanying drawings.

Figure 1:
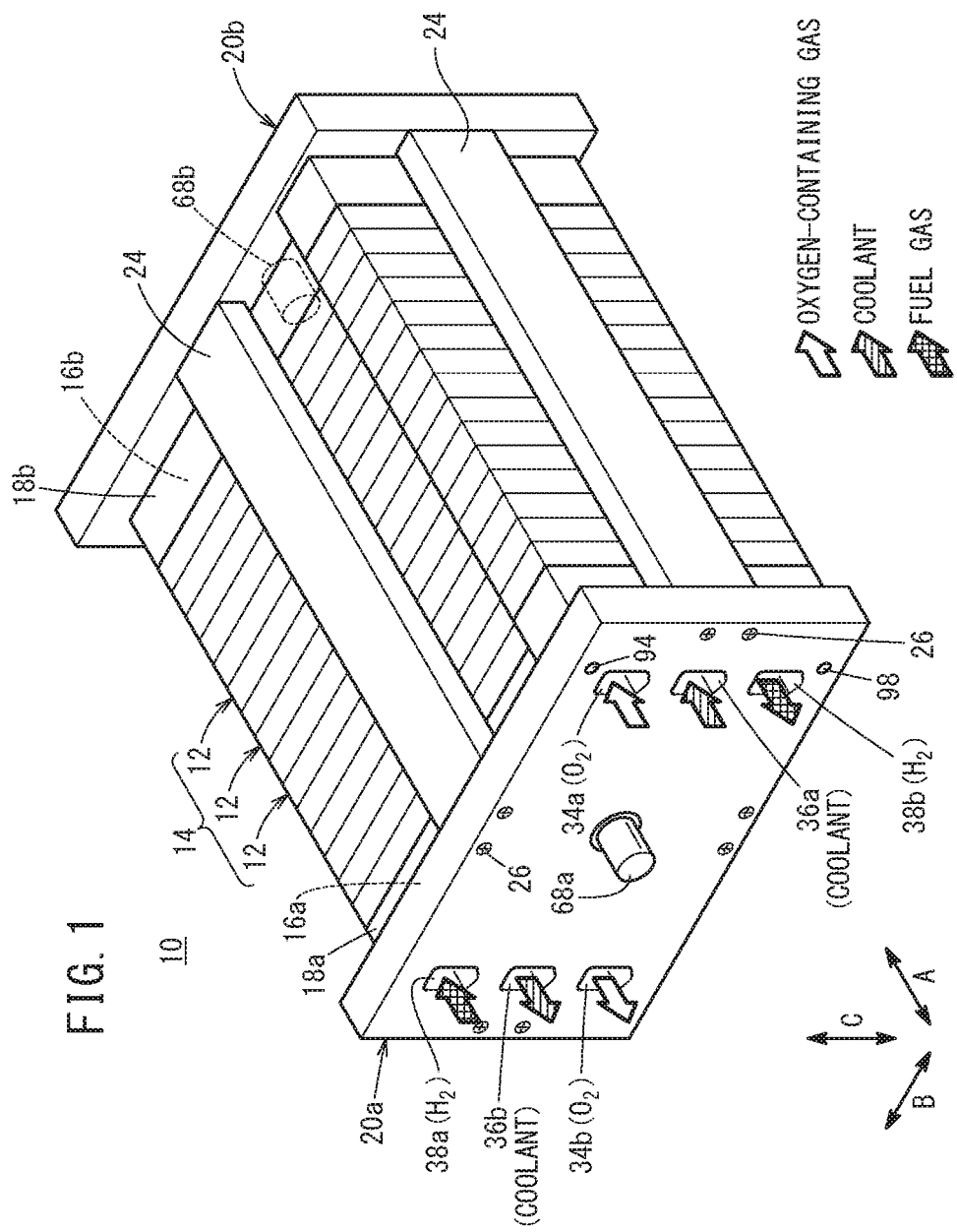
FIG. 1 is a perspective view showing a fuel cell stack.

As shown in FIG. 1, a fuel cell stack 10 includes a stack body 14 formed by stacking a plurality of power generation cells (unit cells) 12 in a horizontal direction (indicated by an arrow A). For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. Coupling bars 24 are positioned between the sides of the end plates 20a, 20b. The terminal plates 16a, 16b are made of electrically conductive material, and terminals 68a, 68b are provided at substantially the central positions of the terminal plates 16a, 16b to protrude outward in the stacking direction.

Each of the end plates 20a, 20b has a laterally elongated (or longitudinally elongated) rectangular shape, and the coupling bars 24 are positioned between the sides of the end plates 20a, 20b. Both ends of the coupling bars 24 are fixed to inner surfaces of the end plates 20a, 20b through bolts 26 to apply a tightening load to a plurality of stacked power generation cells 12 in the stacking direction indicated by the arrow A. It should be noted that the fuel cell stack 10 may have a casing including the end plates 20a, 20b, and the stack body 14 may be placed in the casing.

Figure 2:
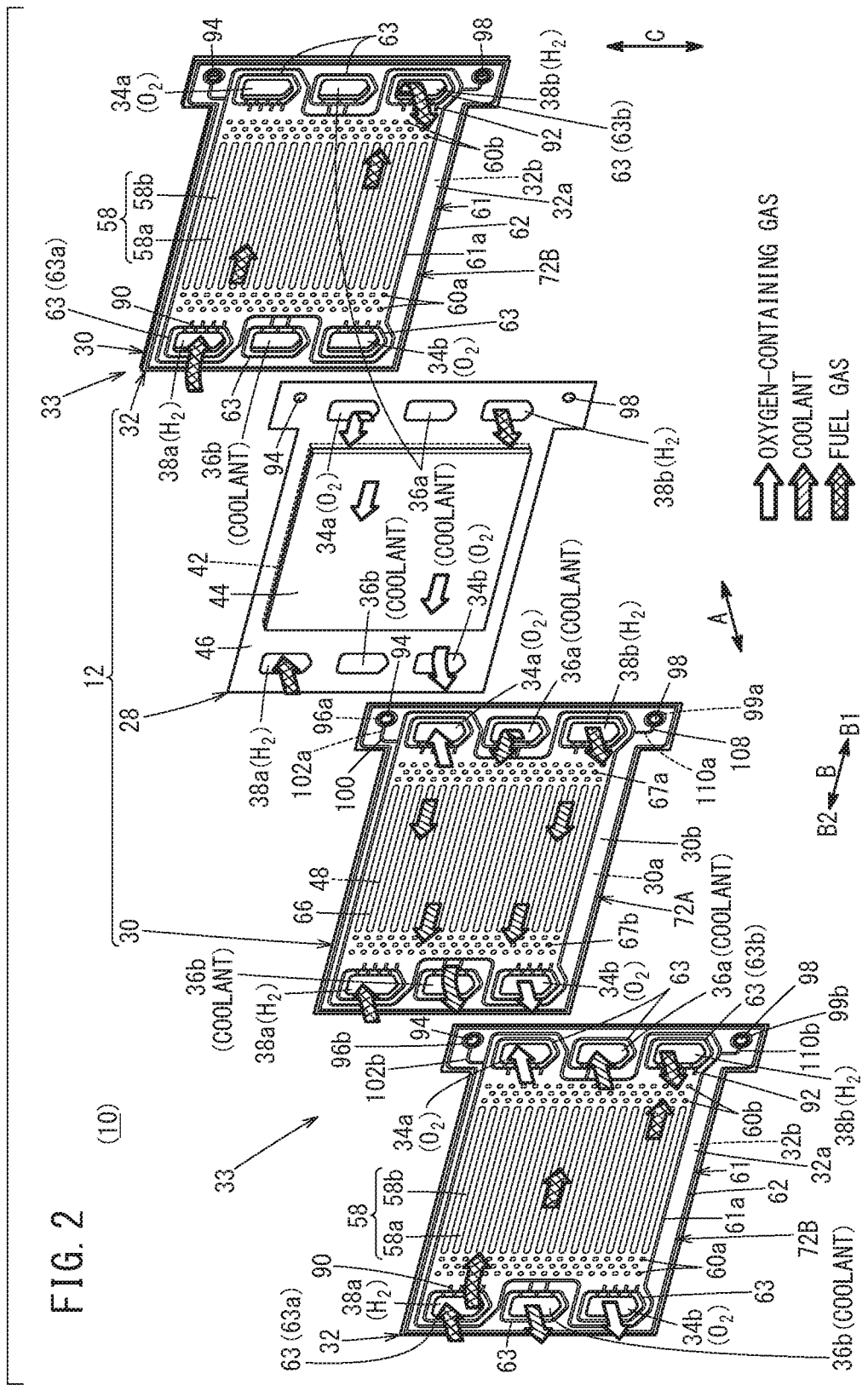
FIG. 2 is an exploded perspective view showing a power generation cell of the fuel cell stack.

As shown in FIG. 2, the power generation cell 12 includes a resin film equipped MEA 28, a first metal separator plate 30 provided on one surface of the resin film equipped MEA 28, and a second metal separator plate 32 provided on the other surface of the resin film equipped MEA 28. For example, a plurality of the power generation cells 12 are stacked together in the direction indicated by the arrow A (horizontal direction) or in a direction indicated by an arrow C (gravity direction), and a tightening load (compression load) is applied to the power generation cells 12 to form the fuel cell stack 10. For example, the fuel cell stack 10 as an in-vehicle fuel cell stack is mounted in a fuel cell electric automobile (not shown).

Each of the first metal separator plate 30 and the second metal separator plate 32 is formed by press forming of a metal thin plate to have a corrugated shape in cross section. For example, the metal plate is a steel plate, a stainless steel plate, an aluminum plate, a plate steel plate, or a metal plate having an anti-corrosive surface by surface treatment. The first metal separator plate 30 of one of the adjacent power generation cells 12 and the second metal separator plate 32 of the other of the adjacent power generation cells 12 are joined together to form a joint separator 33 (fuel cell separator).

At one end of the power generation cell 12 in the longitudinal direction (horizontal direction) (one end in a direction indicated by an arrow B1), an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b extend through the power generation cell 12 in the stacking direction indicated by the arrow A. The oxygen-containing gas supply passage 34a, the coolant supply passage 36a, and the fuel gas discharge passage 38b are arranged in the vertical direction indicated by the arrow C. An oxygen-containing gas is supplied through the oxygen-containing gas supply passage 34a. A coolant such as water is supplied through the coolant supply passage 36a. A fuel gas such as a hydrogen-containing gas is discharged through the fuel gas discharge passage 38b.

At the other end of the power generation cell 12 in the longitudinal direction (one end in a direction indicated by the arrow B2), a fuel gas supply passage 38a, a coolant discharge passage 36b, and an oxygen-containing gas discharge passage 34b are provided. The fuel gas supply passage 38a, the coolant discharge passage 36b, and the oxygen-containing gas discharge passage 34b extend through the power generation cell 12 in the stacking direction indicated by the arrow A. The fuel gas supply passage 38a, the coolant discharge passage 36b, and the oxygen-containing gas discharge passage 34b are arranged in the vertical direction indicated by the arrow C. The fuel gas is supplied through the fuel gas supply passage 38a. The coolant is discharged through the coolant discharge passage 36b. The oxygen-containing gas is discharged through the oxygen-containing gas discharge passage 34b. The layout of the oxygen-containing gas supply passage 34a, the oxygen-containing gas discharge passage 34b, the fuel gas supply passage 38a, and the fuel gas discharge passage 38b is not limited to the above embodiment, and may be changed depending on the required specification.

Figure 3:
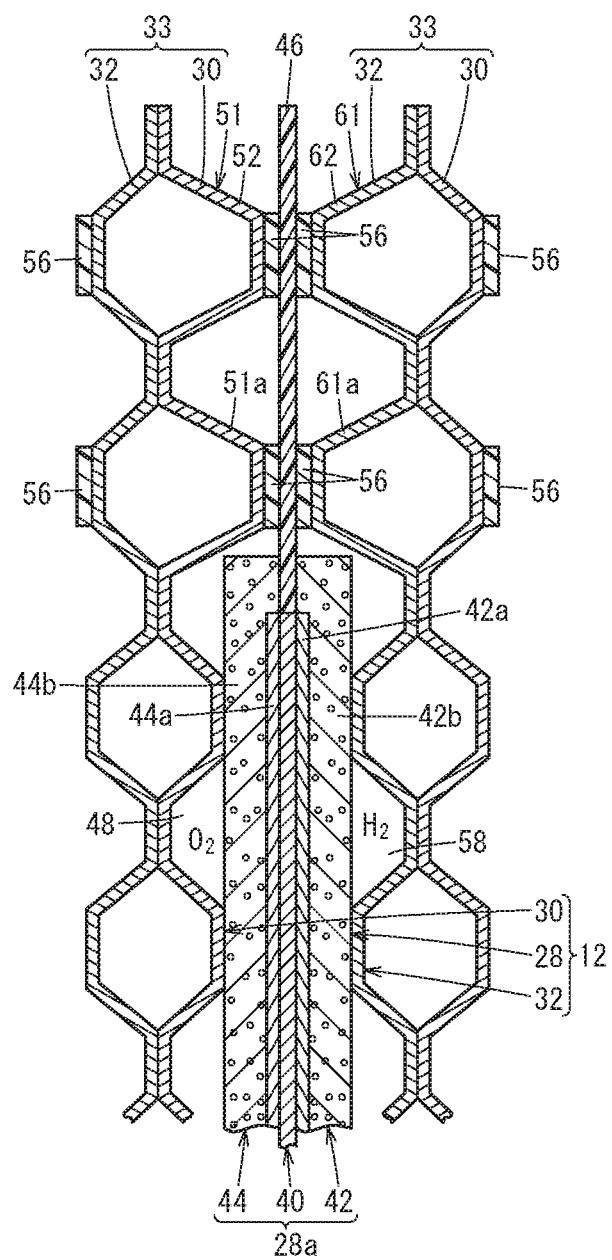
FIG. 3 is a cross sectional view schematically showing the power generation cell.

As shown in FIG. 3, the resin film equipped MEA 28 includes a membrane electrode assembly 28a, and a frame shaped resin film 46 provided in the outer portion of the membrane electrode assembly 28a. The membrane electrode assembly 28a includes an electrolyte membrane 40, and an anode 42 and a cathode 44 sandwiching the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44a joined to one surface of the electrolyte membrane 40, and a first gas diffusion layer 44b stacked on the first electrode catalyst layer 44a. The anode 42 includes a second electrode catalyst layer 42a joined to the other surface of the electrolyte membrane 40, and a second gas diffusion layer 42b stacked on the second electrode catalyst layer 42a.

The inner end surface of the resin film 46 is positioned close to, overlapped with, or contacts the outer end surface of the electrolyte membrane 40. As shown in FIG. 2, at one end of the resin film 46 in the direction indicated by the arrow B1, the oxygen-containing gas supply passage 34a, the coolant supply passage 36a, and the fuel gas discharge passage 38b are provided. At the other end of the resin film 46 in the direction indicated by the arrow B2, the fuel gas supply passage 38a, the coolant discharge passage 36b, and the oxygen-containing gas discharge passage 34b are provided.

For example, the resin film 46 is made of PPS (poly phenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified poly phenylene ether), PET (polyethylene terephthalate), PBT (polybutylene terephthalate), or modified polyolefin. It should be noted that the electrolyte membrane 40 may be configured to protrude outward without using the resin film 46. Alternatively, a frame shaped film may be provided on both sides of the electrolyte membrane 40 which protrudes outward.

Figure 4:
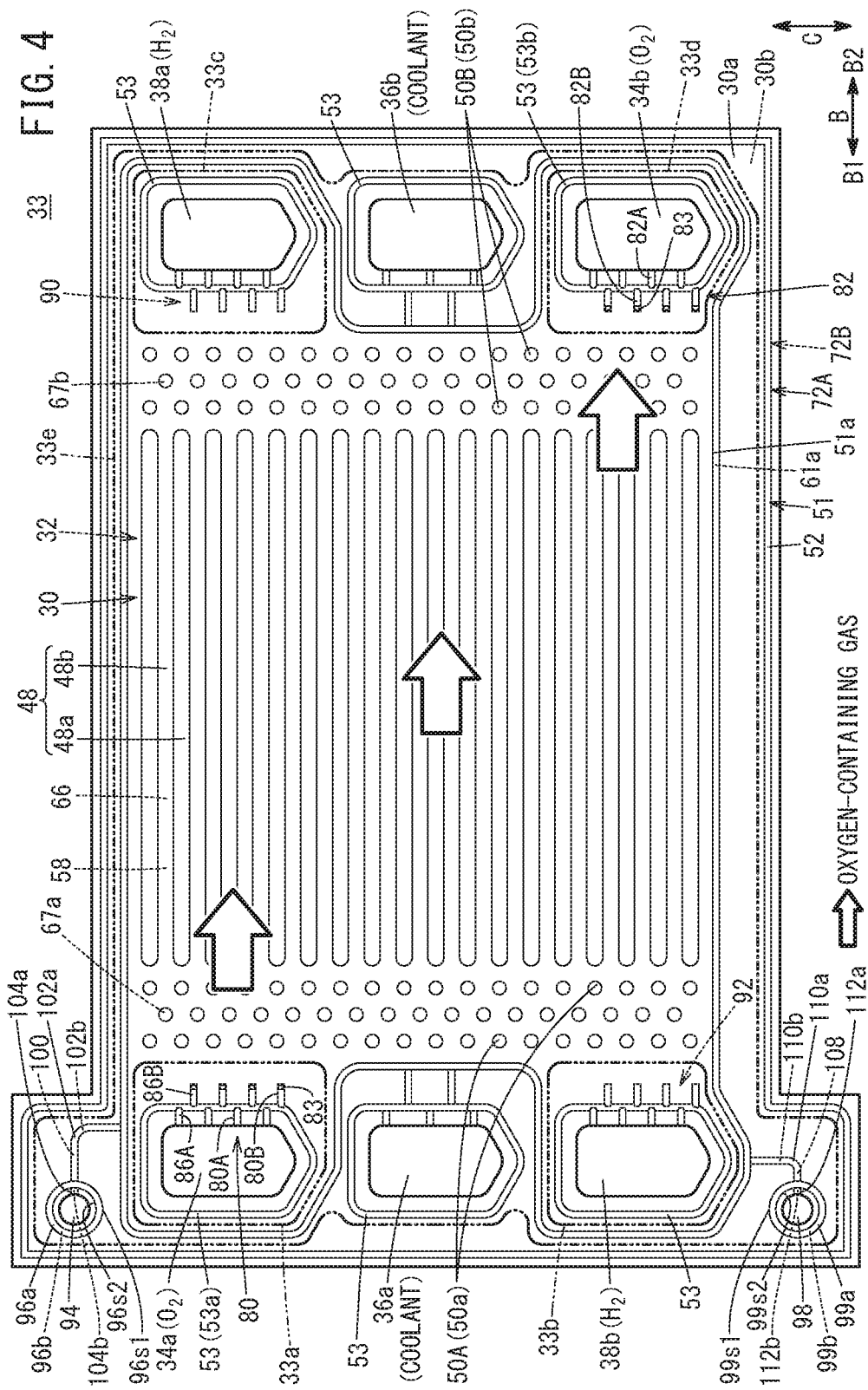
FIG. 4 is a front view showing a joint separator as viewed from a first metal separator plate.

As shown in FIG. 4, an oxygen-containing gas flow field 48 is provided on a surface 30a of the first metal separator plate 30 facing the resin film equipped MEA 28 (hereinafter referred to as the "surface 30a"). For example, the oxygen-containing gas flow field 48 extends in the direction indicated by the arrow B.

The oxygen-containing gas flow field 48 is connected to (in fluid communication with) the oxygen-containing gas supply passage 34a and the oxygen-containing gas discharge passage 34b. The oxygen-containing gas flow field 48 includes straight flow grooves 48b between a plurality of ridges 48a extending in the direction indicated by the arrow B. Instead of the plurality of straight flow grooves 48b, a plurality of wavy or serpentine flow grooves may be provided.

An inlet buffer 50A is provided on the surface 30a of the first metal separator plate 30, between the oxygen-containing gas supply passage 34a and the oxygen-containing gas flow field 48. The inlet buffer 50A includes a plurality of boss arrays each including a plurality of bosses 50a arranged in a direction indicated by an arrow C. Further, an outlet buffer 50B is provided on the surface 30a of the first metal separator plate 30, between the oxygen-containing gas discharge passage 34b and the oxygen-containing gas flow field 48. The outlet buffer 50B includes a plurality of boss arrays each including a plurality of bosses 50b.

On a surface 30b of the first metal separator plate 30 on the other side of the oxygen-containing gas flow field 48, boss arrays each including a plurality of bosses 67a arranged in the direction indicated by the arrow C are provided between the boss arrays of the inlet buffer 50A, and boss arrays each including a plurality of bosses 67b arranged in the direction indicated by the arrow C are provided between the boss arrays of the outlet buffer 50B. The bosses 67a, 67b form a buffer on the coolant surface.

A first bead 72A including a first seal line (seal bead) 51 is formed on the surface 30a of the first metal separator plate 30 by press forming. The first bead 72A is expanded toward the resin film equipped MEA 28 (FIG. 2). As shown in FIG. 3, resin material 56 is fixed to protruding front surfaces of the first seal line 51 by printing, coating, etc. For example, polyester fiber is used as the resin material 56. The resin material 56 may be provided on the part of the resin film 46. The resin material 56 is not essential. The resin material 56 may be dispensed with.

As shown in FIG. 4, the first seal line 51 includes a bead seal 51a (hereinafter referred to as the "inner bead 51a") provided around the oxygen-containing gas flow field 48, the inlet buffer 50A and the outlet buffer 50B, a bead seal 52 (hereinafter referred to as the "outer bead 52") provided outside the inner bead 51a along the outer end of the first metal separator plate 30, and a plurality of bead seals 53 (hereinafter referred to as the "passage beads 53") provided around the plurality of fluid passages (oxygen-containing gas supply passage 34a, etc.), respectively. The outer bead 52 protrudes from the surface 30a of the first metal separator plate 30 toward the resin film equipped MEA 28, and the outer bead 52 is provided along the outer marginal portion of the surface 30a of the first metal separator plate 30.

The plurality of passage beads 53 protrude from the surface 30a of the first metal separator plate 30 toward the resin film equipped MEA 28. The passage beads 53 are provided around the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b, respectively.

Hereinafter, among the plurality of passage beads 53, the passage bead formed around the oxygen-containing gas supply passage 34a will be referred to as the "passage bead 53a", and the passage bead formed around the oxygen-containing gas discharge passage 34b will be referred to as the "passage bead 53b". The first metal separator plate 30 has bridge sections 80, 82 connecting the inside of the passage beads 53a, 53b (fluid passages 34a, 34b) and the outside (oxygen-containing gas flow field 48) of the passage beads 53a, 53b.

The bridge section 80 is provided on a side part of the passage bead 53a formed around the oxygen-containing gas supply passage 34a, adjacent to the oxygen-containing gas flow field 48. The bridge section 82 is provided on a side part of the passage bead 53b formed around the oxygen-containing gas discharge passage 34b, adjacent to the oxygen-containing gas flow field 48.

The passage bead 53a and the passage bead 53b have the same structure. Further, the bridge section 80 adjacent to the oxygen-containing gas supply passage 34a and the bridge section 82 adjacent to the oxygen-containing gas discharge passage 34b have the same structure. Therefore, hereinafter, the structure of the passage bead 53a and the bridge section 80 will be described in detail as a representative example, and the detailed description about the structure of the passage bead 53b and the bridge section 82 will be omitted.

The bridge section 80 includes a plurality of inner bridges 80A provided at intervals inside the passage bead 53a, and a plurality of outer bridges 80B provided at intervals outside the passage bead 53a. Each of the inner bridges 80A includes an inner tunnel 86A protruding from the passage bead 53a toward the oxygen-containing gas supply passage 34a. The inner bridge 80A is opened in the oxygen-containing gas supply passage 34a. The outer bridge 80B protrudes from the passage bead 53a toward the oxygen-containing gas flow field 48, and includes an outer tunnel 86B. A hole 83 is formed at the front end of the outer tunnel 86B. The inner tunnel 86A and the outer tunnel 86B are formed by press forming, to protrude toward the resin film equipped MEA 28. The internal spaces of the inner tunnel 86A and the outer tunnel 86B (formed by recesses on the back surfaces of the inner tunnel 86A and the outer tunnel 86B) are connected to the internal space of the passage bead 53*a* (formed by recesses on the back surface of the passage bead 53*a*) for allowing the oxygen-containing gas to flow between these internal spaces.

In the embodiment of the present invention, the plurality of inner bridges 80A and the plurality of outer bridges 80B are provided alternately (in a zigzag pattern) along the passage bead 53*a*. The plurality of inner bridges 80A and the plurality of outer bridges 80B may be provided to face each other through the passage bead 53*a*. As shown in FIG. 2, the second metal separator plate 32 has a fuel gas flow field 58 on its surface 32*a* facing the resin film equipped MEA 28 (hereinafter referred to as the "surface 32*a*"). For example, the fuel gas flow field 58 extends in the direction indicated by the arrow B.

Figure 5:
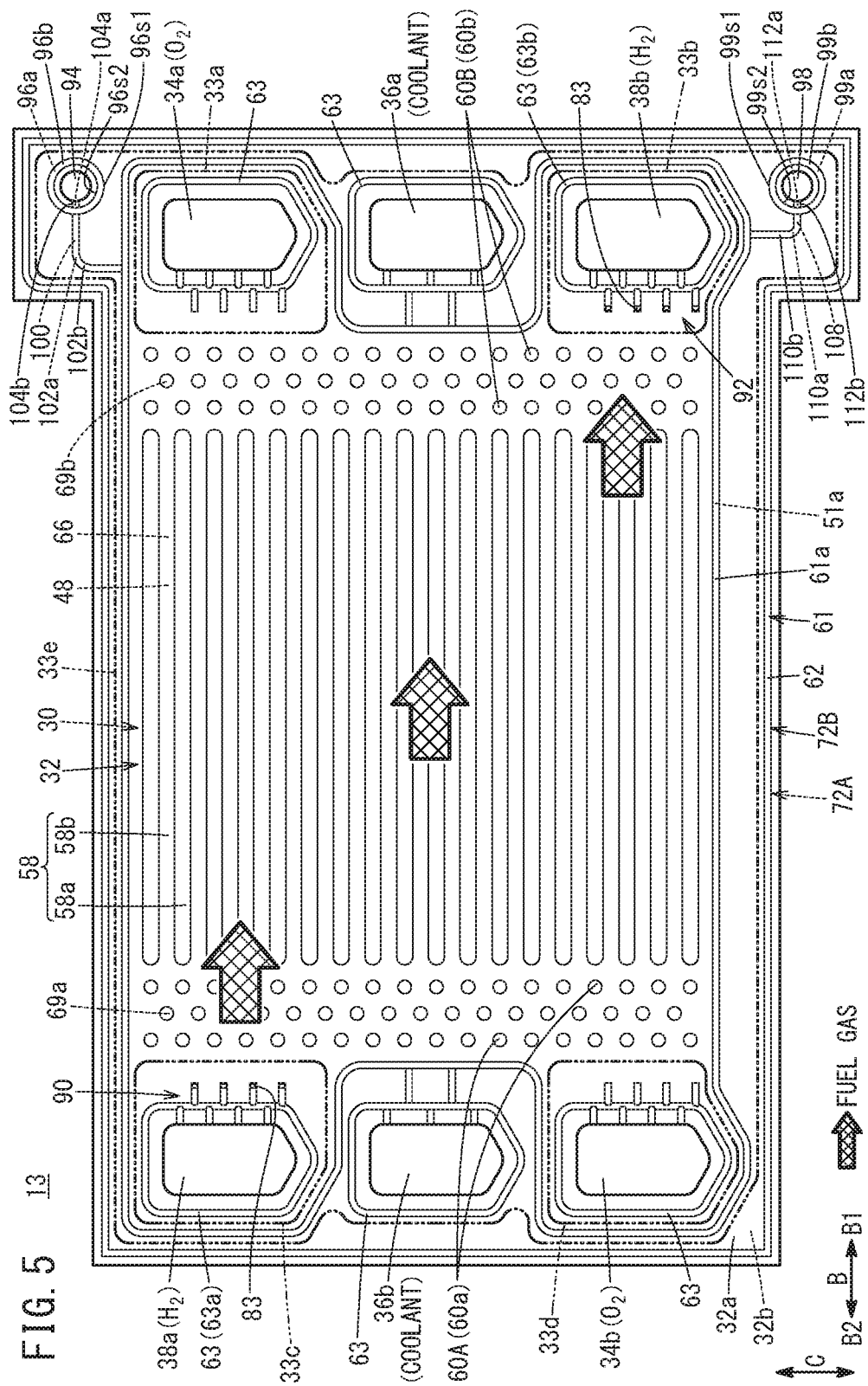
FIG. 5 is a front view showing the joint separator as viewed from a second metal separator plate.

As shown in FIG. 5, the fuel gas flow field 58 is connected to (in fluid communication with) the fuel gas supply passage 38*a* and the fuel gas discharge passage 38*b*. The fuel gas flow field 58 includes straight flow grooves 58*b* between a plurality of ridges 58*a* extending in the direction indicated by the arrow B. Instead of the straight flow grooves 58*b*, wavy or serpentine flow grooves may be provided.

An inlet buffer 60A is provided on the surface 32*a* of the second metal separator plate 32, between the fuel gas supply passage 38*a* and the fuel gas flow field 58. The inlet buffer 60A includes a plurality of boss arrays each including a plurality of bosses 60*a* extending in the direction indicated by the arrow C. Further, on the surface 32*a* of the second metal separator plate 32, an outlet buffer 60B including a plurality of boss arrays is provided between the fuel gas discharge passage 38*b* and the fuel gas flow field 58. Each of the boss arrays includes a plurality of bosses 60*b*.

On a surface 32*b* of the second metal separator plate 32, on the other side of the fuel gas flow field 58, boss arrays each including a plurality of bosses 69*a* arranged in the direction indicated by the arrow C are provided between the boss arrays of the inlet buffer 60A, and boss arrays each including a plurality of bosses 69*b* arranged in the direction indicated by the arrow C are provided between the boss arrays of the outlet buffer 60B. The bosses 69*a*, 69*b* form a buffer on the coolant surface.

A second bead 72B including a second seal line 61 (seal bead) is formed on the surface 32*a* of the second metal separator plate 32. The second bead 72B is formed by press forming, and expanded toward the resin film equipped MEA 28.

As shown in FIG. 3, resin material 56 is fixed to protruding front surfaces of the second seal line 61 by printing, coating, etc. For example, polyester fiber is used as the resin material 56. The resin material 56 may be provided on the part of the resin film 46. The resin material 56 is not essential. The resin material 56 may be dispensed with.

As shown in FIG. 5, the second seal line 61 includes a bead seal 61*a* (hereinafter referred to as the "inner bead 61*a*") provided around the fuel gas flow field 58, the inlet buffer 60A and the outlet buffer 60B, a bead seal 62 (hereinafter referred to as the "outer bead 62") provided outside the inner bead 61*a* along the outer end of the second metal separator plate 32, and a plurality of bead seals 63 (hereinafter referred to as the "passage beads 63") provided around the plurality of fluid passages (fluid passage 38*a*, etc.), respectively. The outer bead 62 protrudes from the surface 32*a* of the second metal separator plate 32, and the outer bead 62 is provided along the outer marginal portion of the surface 32*a* of the second metal separator plate 32.

The plurality of passage beads 63 protrude from the surface 32*a* of the second metal separator plate 32. The passage beads 63 are provided around the oxygen-containing gas supply passage 34*a*, the oxygen-containing gas discharge passage 34*b*, the fuel gas supply passage 38*a*, the fuel gas discharge passage 38*b*, the coolant supply passage 36*a*, and the coolant discharge passage 36*b*, respectively.

The second metal separator plate 32 has bridge sections 90, 92 connecting the inside of passage beads 63*a*, 63*b* (fluid passages 38*a*, 38*b*) around the fuel gas supply passage 38*a* and the fuel gas discharge passage 38*b*, and the outside (fuel gas flow field 58) of the passage beads 63*a*, 63*b*.

The bridge section 90 is provided on a side part of the passage bead 63*a* formed around the fuel gas supply passage 38*a*, adjacent to the fuel gas flow field 58. The bridge section 92 is provided on a side part of the passage bead 63*b* formed around the fuel gas discharge passage 38*b*, adjacent to the fuel gas flow field 58.

The bridge sections 90, 92 provided in the second metal separator plate 32 and the bridge sections 80, 82 (FIG. 4) provided in the first metal separator plate 30 have the same structure. The passage beads 63*a*, 63*b* have the same structure and the layout as the above described passage beads 53*a*, 53*b* (FIG. 4).

As shown in FIG. 2, a coolant flow field 66 is formed between the surface 30*b* of the first metal separator plate 30 and the surface 32*b* of the second metal separator plate 32 that are joined together. The coolant flow field 66 is connected to (in fluid communication with) the coolant supply passage 36*a* and the coolant discharge passage 36*b*. The coolant flow field 66 is formed by stacking a surface of the first metal separator plate 30 on the back of the oxygen-containing gas flow field 48 and a surface of the second metal separator plate 32 on the back of the fuel gas flow field 58 together.

As shown in FIGS. 4 and 5, the first metal separator plate 30 and the second metal separator plate 32 of the joint separator 33 are joined together by laser welding lines 33*a* to 33*e*. The laser welding line 33*a* is formed around the oxygen-containing gas supply passage 34*a* and the bridge section 80. The laser welding line 33*b* is formed around the fuel gas discharge passage 38*b* and the bridge section 92.

The laser welding line 33*c* is formed around the fuel gas supply passage 38*a* and the bridge section 90. The laser welding line 33*d* is formed around the oxygen-containing gas discharge passage 34*b* and the bridge section 82. The laser welding line 33*e* is formed around the oxygen-containing gas flow field 48, the fuel gas flow field 58, the coolant flow field 66, the oxygen-containing gas supply passage 34*a*, the oxygen-containing gas discharge passage 34*b*, the fuel gas supply passage 38*a*, the fuel gas discharge passage 38*b*, the coolant supply passage 36*a*, the coolant discharge passage 36*b*, and an air release passage 94 and a coolant drain passage 98 described later, along the outer end of the joint separator 33. The first metal separator plate 30 and the second metal separator plate 32 may be joined together by brazing, instead of welding such as laser welding.

As shown in FIG. 2, the air release passage 94 and the coolant drain passage 98 extend through the first metal separator plate 30, the second metal separator plate 32, and the resin film equipped MEA 28 (resin film 46) in a separator thickness direction (stacking direction). The air release passage 94 is provided for releasing the air in the coolant. The air release passage 94 is provided at an upper corner of the power generation cell 12 at one end in the horizontal direction (indicated by the arrow B1). The coolant drain passage 98 is provided at a lower corner of the power generation cell 12 at one end in the horizontal direction (indicated by the arrow B1). It should be noted that one of the air release passage 94 and the coolant drain passage 98 may be provided at one end of the power generation cell 12 in the horizontal direction, and the other of the air release passage 94 and the coolant drain passage 98 may be provided at the other end of the power generation cell 12 in the horizontal direction.

As shown in FIGS. 4 and 5, the air release passage 94 is provided above the uppermost positions of the inner beads 51a, 61a. The air release passage 94 is provided above the fluid passage 34a provided at the highest position among the plurality of fluid passages 34a, 36a, 38b which are arranged vertically. In the embodiment of the present invention, the air release passage 94 has a circular shape. Alternatively, the air release passage 94 may have an oval shape or a polygonal shape.

As shown in FIG. 4, a passage bead seal 96a is formed by press forming around the air release passage 94 on the surface 30a of the first metal separator plate 30. The passage bead seal 96a is expanded toward the resin film 46 (FIG. 2). As shown in FIG. 5, the passage bead seal 96b is formed by press forming around the air release passage 94, on the surface 32a of the second metal separator plate 32. The passage bead seal 96b is expanded toward the resin film 46 (FIG. 2). The passage bead seals 96a, 96b have a circular shape in a plan view.

Figure 6:
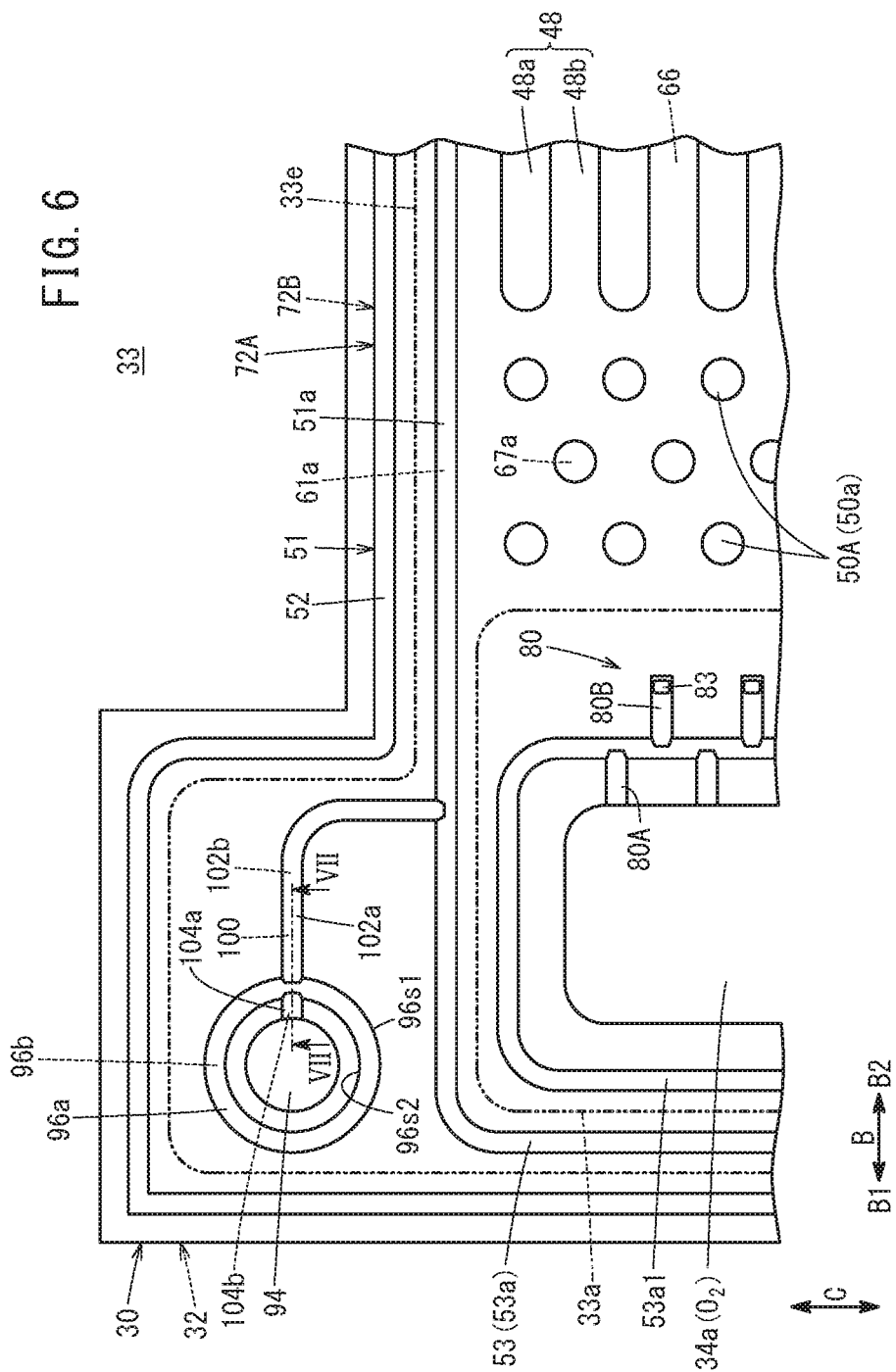
FIG. 6 is a view showing an air release passage of the joint separator and an area around the air release passage.

As shown in FIG. 6, the air release passage 94 is connected to the coolant flow field 66 through a first connection channel 100. The first connection channel 100 is a space formed by recesses on the back of the protrusions of the first bead 72A and the second bead 72B. The first connection channel 100 connects the air release passage 94 and the internal spaces (recesses on the back) of the inner beads 51a, 61a. Specifically, the first bead 72A and the second bead 72B include upper connection beads 102a, 102b, and the first connection channel 100 is formed inside the upper connection beads 102a, 102b. One end of the upper connection bead 102a and one end of the upper connection bead 102b are connected to the uppermost position of the inner bead 51a, 61a, and the other ends of the upper connection beads 102a, 102b are connected to outer side walls 96s1 of the passage bead seals 96a, 96b.

Figure 7:
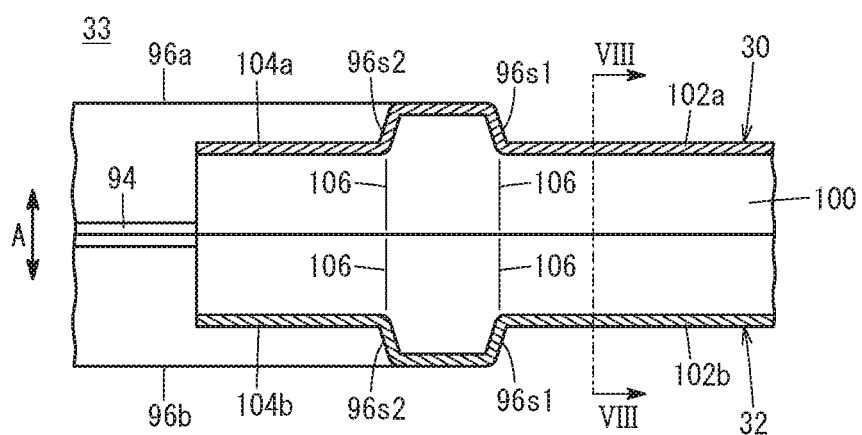
FIG. 7 is a cross sectional view taken along a line VII-VII in FIG. 6.

As shown in FIG. 7, tunnels 104a, 104b are provided in the first metal separator plate 30 and the second metal separator plate 32, respectively. The tunnels 104a, 104b protrude from inner side walls 96s2 of the passage bead seals 96a, 96b toward the air release passage 94. The coolant flow field 66 and the air release passage 94 are connected to each other through the internal spaces of the inner bead 51a, 61a, the internal spaces of the upper connection beads 102a, 102b (first connection channel 100), the internal spaces of the passage bead seals 96a, 96b, and the internal spaces of the tunnels 104a, 104b. It should be noted that only one of the upper connection beads 102a, 102b may be provided, and only one of the tunnels 104a, 104b may be provided.

In order to prevent bypassing of the reactant gas (bypassing of the reactant gas in the direction indicated by the arrow B) in the reactant gas flow field at the end in the flow field width direction, bypass prevention ridges may be provided by press forming, to protrude toward the resin film 46, and protrude from the inner beads 51a, 61a toward the oxygen-containing gas flow field 48 and the fuel gas flow field 58, respectively. A plurality of the bypass prevention ridges may be provided at intervals in the flow field length direction (indicated by the arrow B) of the reactant gas flow field. In this case, the recess on the back of the bypass prevention ridge form part of a channel connecting the coolant flow field 66 and the air release passage 94.

In the embodiment of the present invention, the inner side walls 96s2 and the outer side walls 96s1 of the passage bead seals 96a, 96b are inclined from the separator thickness direction (Connection beads 110a, 110b are also inclined from the separator thickness direction.). Therefore, each of the passage bead seals 96a, 96b has a trapezoidal shape in cross section taken along the separator thickness direction. The inner side walls 96s2 and the outer side walls 96s1 of the passage bead seals 96a, 96b may be in parallel with the separator thickness direction. That is, the passage bead seals 96a, 96b may have a rectangular shape in cross section taken along the separator thickness direction.

A through hole 106 is formed in each of the inner side walls 96s2 and the outer side walls 96s1 of the passage bead seals 96a, 96b. Ends of the tunnels 104a, 104b opposite to portions connected to the passage bead seals 96a, 96b are opened in the air release passage 94. As long as the through hole 106 is provided in the inner side wall 96s2, the tunnels 104a, 104b may be dispensed with.

The first connection channel 100 as the internal space of the upper connection beads 102a, 102b are connected to the internal space of the passage bead seals 96a, 96b through the through hole 106 provided in the outer side walls 96s1 of the passage bead seals 96a, 96b.

The protruding heights of the upper connection beads 102a, 102b and the tunnels 104a, 104b are lower than the protruding heights of the passage bead seals 96a, 96b, respectively. (Likewise, the protruding heights of lower connection beads 110a, 110b and tunnels 112a, 112b described later are lower than the protruding heights of passage bead seals, respectively.) Preferably, the upper connection beads 102a, 102b should be provided at positions facing the tunnels 104a, 104b through the passage bead seals 96a, 96b. However, as long as the upper connection beads 102a, 102b are connected to the tunnels 104a, 104b, the upper connection beads 102a, 102b may not be provided at positions facing the tunnels 104a, 104b.

Figure 8:
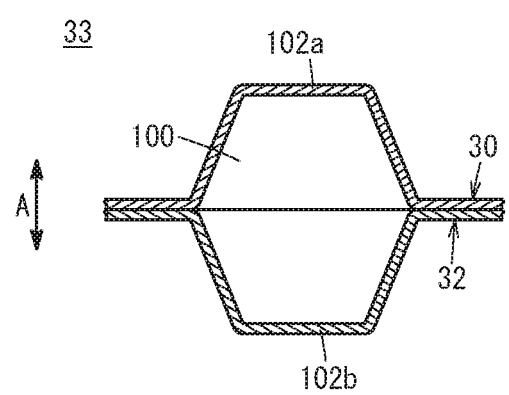
FIG. 8 is a cross sectional view taken along a line VIII-VIII in FIG. 7.

As shown in FIGS. 7 and 8, the first connection channel 100 is formed by the back side of the upper connection bead 102a provided in the first metal separator plate 30 and the back side of the upper connection bead 102b provided in the second metal separator plate 32. As in the case of the passage bead seals 96a, 96b, the upper connection beads 102a, 102b have a trapezoidal shape in cross section taken along the separator thickness direction. The upper connection beads 102a, 102b may have a rectangular shape in cross section taken along the separator thickness direction.

As shown in FIGS. 4 and 5, the coolant drain passage 98 is provided below the lowermost positions of the inner beads 51a, 61a. The coolant drain passage 98 is provided below the fluid passage 38b provided at the lowest position among the plurality of fluid passages 34a, 36a, 38b which are arranged vertically. The coolant drain passage 98 has a circular shape. The coolant drain passage 98 may have an oval shape (not limited to the geometrically perfect oval shape, but including a substantially oval shape), an ellipse shape, or a polygonal shape.

As shown in FIG. 4, a passage bead seal 99a around the coolant drain passage 98 is formed by press forming in the surface 30a of the first metal separator plate 30. The passage bead seal 99a is expanded toward the resin film 46 (FIG. 2). As shown in FIG. 5, a passage bead seal 99b around the coolant drain passage 98 is formed by press forming in the surface 32a of the second metal separator plate 32. The passage bead seal 99b is expanded toward the resin film 46

(FIG. 2). The passage bead seals 99a, 99b have a circular shape in a plan view. The passage bead seals 99a, 99b have the same structure as the passage bead seals 96a, 96b described above.

Figure 9:
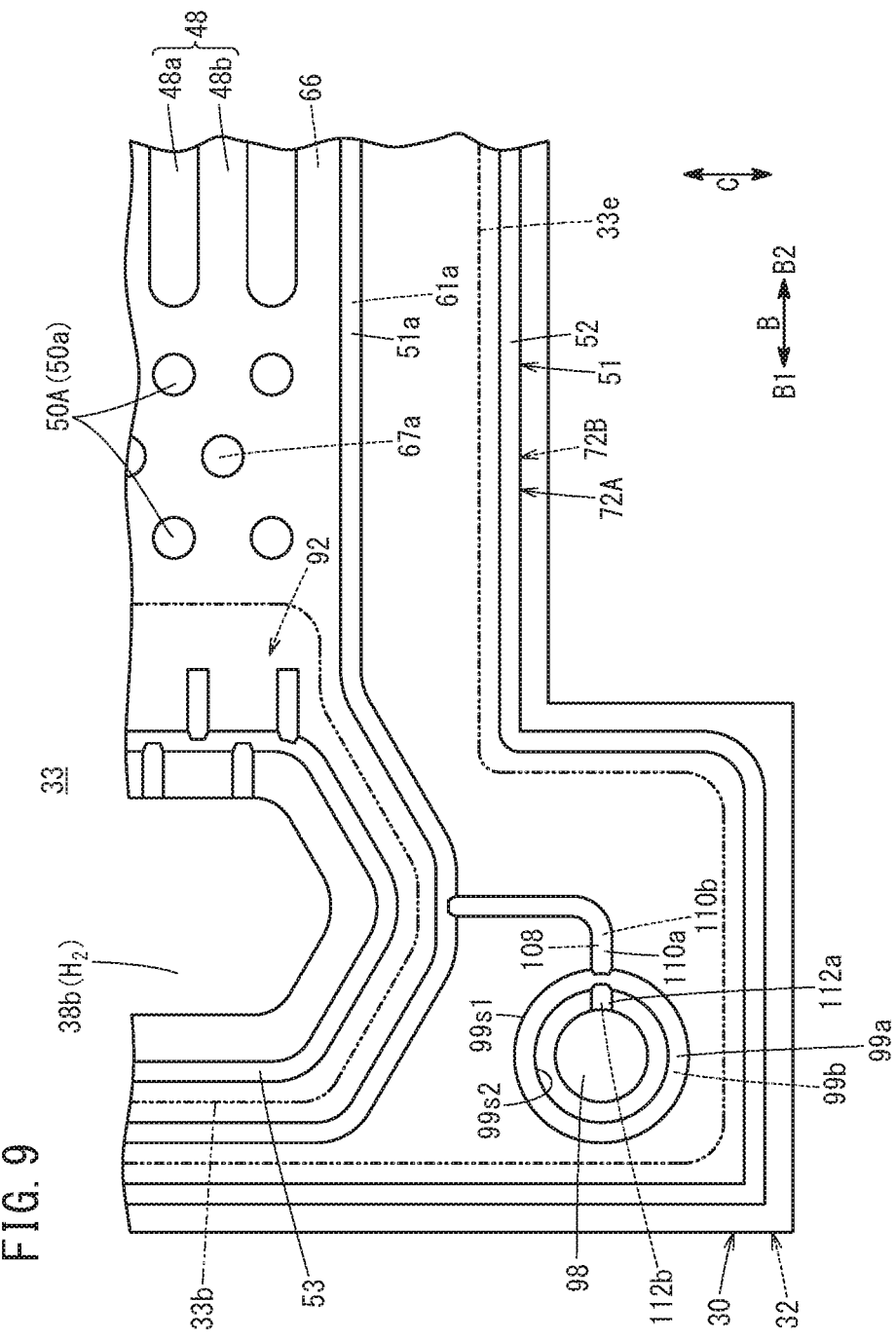
FIG. 9 is a view showing structure of a coolant drain passage of the joint separator and an area around the coolant drain passage.

As shown in FIG. 9, the coolant drain passage 98 is connected to the coolant flow field 66 through a second connection channel 108. The second connection channel 108 is a space formed by recesses on the back of the protrusions of the first bead 72A and the second bead 72B. The second connection channel 108 connects the coolant drain passage 98 and the internal spaces of the inner beads 51a, 61a (recesses on the back of the inner beads 51a, 61a). Specifically, the first bead 72A and the second bead 72B include lower connection beads 110a, 110b. The second connection channel 108 is formed inside the first bead 72A and the second bead 72B. Only one of the lower connection beads 110a, 110b may be provided.

The second connection channel 108 is formed by the back side of the lower connection bead 110a provided in the first metal separator plate 30 and the back side of the lower connection bead 110b provided in the second metal separator plate 32. In the same manner as in the cases of the passage bead seals 99a, 99b, the lower connection beads 110a, 110b have a trapezoidal shape in cross section taken along the separator thickness direction. It should be noted that the lower connection beads 110a, 110b may have a rectangular shape in cross section taken along the separator thickness direction.

One end of the lower connection bead 110a and one end of the lower connection bead 110b are connected to the lowermost positions of the inner beads 51a, 61a, and the other ends of the lower connection beads 110a, 110b are connected to outer side walls 99s1 of the passage bead seals 99a, 99b. The lowermost positions of the inner beads 51a, 61a are provided immediately below the fluid passage 38b at the lowest position among the plurality of fluid passages 34a, 36a, 38b which are arranged vertically.

The tunnels 112a, 112b are provided in the first metal separator plate 30 and the second metal separator plate 32, respectively. The tunnels 112a, 112b protrude from inner side walls 99s2 of the passage bead seals 99a, 99b toward the coolant drain passage 98. The coolant flow field 66 and the coolant drain passage 98 are connected to each other through the internal spaces of the inner beads 51a, 61a, the internal spaces of the lower connection beads 110a, 110b (second connection channel 108), the internal spaces of the passage bead seals 99a, 99b, and the internal spaces of the tunnels 112a, 112b. As long as the through hole is provided inside the inner side walls 99s2 of the passage bead seals 99a, 99b, the tunnels 112a, 112b may be dispensed with.

Operation of the fuel cell stack 10 having the above structure will be described below.

First, as shown in FIG. 1, an oxygen-containing gas such as air is supplied to the oxygen-containing gas supply passage 34a of the end plate 20a. A fuel gas such as a hydrogen-containing gas is supplied to the fuel gas supply passage 38a of the end plate 20a. Coolant such as pure water, ethylene glycol, oil is supplied to the coolant supply passage 36a of the end plate 20a.

As shown in FIG. 2, the oxygen-containing gas flows from the oxygen-containing gas supply passage 34a to the oxygen-containing gas flow field 48 of the first metal separator plate 30 through the bridge section 80 (see FIG. 4). Then, as shown in FIG. 1, the oxygen-containing gas flows along the oxygen-containing gas flow field 48 in the direction indicated by the arrow B, and the oxygen-containing gas is supplied to the cathode 44 of the membrane electrode assembly 28a.

In the meanwhile, the fuel gas flows from the fuel gas supply passage 38a into the fuel gas flow field 58 of the second metal separator plate 32 through the bridge section 90. The fuel gas moves along the fuel gas flow field 58 in the direction indicated by the arrow B, and the fuel gas is supplied to the anode 42 of the membrane electrode assembly 28a.

Thus, in each of the membrane electrode assemblies 28a, the oxygen-containing gas supplied to the cathode 44 and the fuel gas supplied to the anode 42 are partially consumed in electrochemical reactions in the first electrode catalyst layer 44a and the second electrode catalyst layer 42a to generate electricity.

Then, after the oxygen-containing gas supplied to the cathode 44 is partially consumed at the cathode 44, the oxygen-containing gas flows from the oxygen-containing gas flow field 48 through the bridge section 82 (FIG. 4) to the oxygen-containing gas discharge passage 34b, and the oxygen-containing gas is discharged along the oxygen-containing gas discharge passage 34b in the direction indicated by the arrow A. Likewise, after the fuel gas supplied to the anode 42 is partially consumed at the anode 42, the fuel gas flows from the fuel gas flow field 58 through the bridge section 92 to the fuel gas discharge passage 38b, and the fuel gas is discharged along the fuel gas discharge passage 38b in the direction indicated by the arrow A.

Further, the coolant supplied to the coolant supply passage 36a flows into the coolant flow field 66 between the first metal separator plate 30 and the second metal separator plate 32, and then, the coolant flows in the direction indicated by the arrow B. After the coolant cools the membrane electrode assembly 28a, the coolant is discharged from the coolant discharge passage 36b.

In this case, the fuel cell stack 10 according to the embodiment of the present invention offers the following advantages.

In the joint separator 33 of the fuel cell stack 10, the air release passage 94 is connected to the coolant flow field 66 through the first connection channel 100 formed by the recesses on the back of the protrusions of the first bead 72A and the second bead 72B. Further, the coolant drain passage 98 is connected to the coolant flow field 66 through the second connection channel 108 formed by the recesses on the back of the protrusions of the first bead 72A and the second bead 72B. In the structure, the recesses on the back of the beads provided in the first metal separator plate 30 and the second metal separator plate 32 are utilized effectively, and it is possible to achieve simple coolant flow field structure.

The first bead 72A and the second bead 72B include the upper connection beads 102a, 102b, and the first connection channel 100 connecting the air release passage 94 and the internal spaces of the inner beads 51a, 61a is formed inside the upper connection beads 102a, 102b. Further, the upper connection beads 102a, 102b are connected to the uppermost positions of the inner beads 51a, 61a provided around the oxygen-containing gas flow field 48 and the fuel gas flow field 58, respectively. In the structure, at the time of supplying the coolant into the coolant flow field 66, it is possible to reliably discharge the air from the coolant flow field 66.

The first bead 72A and the second bead 72B include the lower connection beads 110a, 110b, and the second connection channel 108 connecting the coolant drain passage 98 and the internal spaces of the inner beads 51a, 61a are formed inside the lower connection beads 110*a*, 110*b*. Further, the lower connection beads 110*a*, 110*b* are connected to the lowermost positions of the inner beads 51*a*, 61*a*, provided around the oxygen-containing gas flow field 48 and the fuel gas flow field 58, respectively. In the structure, at the time of performing a maintenance operation, etc., it is possible to reliably release the coolant from the coolant flow field 66.

Since the passage bead seals 99*a*, 99*b* around the air release passage 94 are provided for the first metal separator plate 30 and the second metal separator plate 32, it is possible to suitably prevent leakage of the reactant gases to the air release passage 94. Further, since the passage bead seals 99*a*, 99*b* around the coolant drain passage 98 are provided for the first metal separator plate 30 and the second metal separator plate 32, it is possible to suitably prevent leakage of the reactant gases to the coolant drain passage 98.

The outer end of the coolant flow field 66 and the outer end of the reactant gas passage (e.g., passage 34*a*) are joined together by welding or brazing. In the structure, it is possible to suitably prevent leakage of the coolant to the outside of the joint separator 33 and to the reactant gas passages.

The present invention is not limited to the above described embodiment. Various modifications may be made without departing from the gist of the present invention.

What is claimed is:

1. A fuel cell separator including two metal separator plates joined together, a metal bead protruding from one surface of each of the metal separator plates where a reactant gas flows, a reactant gas flow field being formed on the one surface of the metal separator plate and configured to allow a reactant gas of a fuel gas or an oxygen-containing gas to flow along the reactant gas flow field, a coolant flow field being formed between the two metal separator plates, a reactant gas passage connected to the reactant gas flow field extending through the fuel cell separator in a separator thickness direction, the bead including a seal bead configured to prevent leakage of the reactant gas, wherein an air release passage extends through the fuel cell separator in the separator thickness direction, and
the metal bead includes an upper connection bead branched outward from an upper portion of the seal bead surrounding the reactant gas passage and the reactant gas flow field, and
the air release passage is connected to the coolant flow field through a connection channel formed by a recess on a back of a protrusion of the upper connection bead and through an internal space of the seal bead, wherein the upper connection bead extends from a passage bead seal surrounding the air release passage to the seal bead.

2. A fuel cell separator including two metal separator plates joined together, a metal bead protruding from one surface of each of the metal separator plates where a reactant gas flows, a reactant gas flow field being formed on the one surface of the metal separator plate and configured to allow a reactant gas of a fuel gas or an oxygen-containing gas to flow along the reactant gas flow field, a coolant flow field being formed between the two metal separator plates, a reactant gas passage connected to the reactant gas flow field extending through the fuel cell separator in a separator thickness direction, the bead including a seal bead configured to prevent leakage of the reactant gas, wherein a coolant drain passage extends through the fuel cell separator in the separator thickness direction, and
the metal bead includes a lower connection bead branched outward from a lower portion of the seal bead surrounding the reactant gas passage and the reactant gas flow field, and
the coolant drain passage is connected to the coolant flow field through a connection channel formed by a recess on a back of a protrusion of the lower connection bead and through an internal space of the seal bead, wherein the lower connection bead extends from a passage bead seal surrounding the cool drain passage to the seal bead.

3. The fuel cell separator according to claim 1, wherein the passage bead seal has a circular shape in a plan view.

4. The fuel cell separator according to claim 3, wherein the passage bead seal includes an inner side wall inclined from the separator thickness direction, and
the inner side wall has a through hole configured to connect an internal space of the passage bead seal and the air release passage.

5. The fuel cell separator according to claim 1, wherein an outer end of the coolant flow field and an outer end of the reactant gas passage are joined together by welding or brazing.

6. The fuel cell separator according to claim 1, wherein the passage bead seal is provided entirely around the air release passage, and
the air release passage, the passage bead seal, and the upper connection bead are provided above the seal bead around the reactant gas flow field.

7. The fuel cell separator according to claim 1, wherein the upper connection bead is provided at an upper position of one end of the fuel cell separator in a longitudinal direction.

8. The fuel cell separator according to claim 1, wherein the upper connection bead is bent in an L-shape.

9. The fuel cell separator according to claim 2, wherein the passage bead seal is provided entirely around the coolant drain passage, and
the coolant drain passage, the passage bead seal, and the lower connection bead are provided below the seal bead around the reactant gas flow field.

10. The fuel cell separator according to claim 2, wherein the lower connection bead is provided at a lower position of one end of the fuel cell separator in a longitudinal direction.

11. The fuel cell separator according to claim 2, wherein the lower connection bead is bend in an L-shape.

* * * * *